June 20, 1933.  A. L. WALLACE  1,915,041
HOSE COUPLING
Filed May 14, 1929
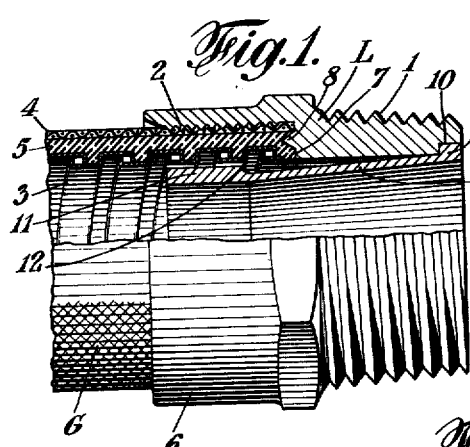
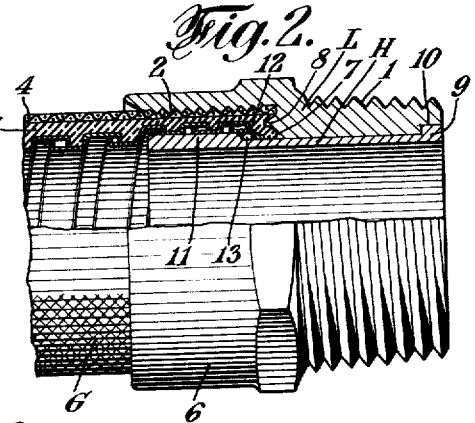
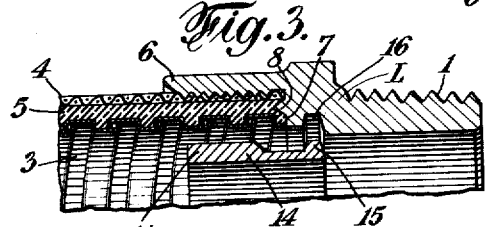
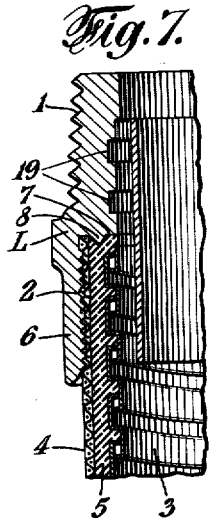
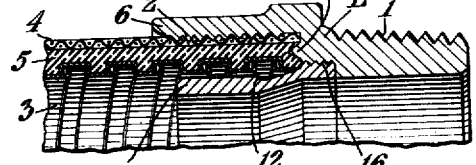
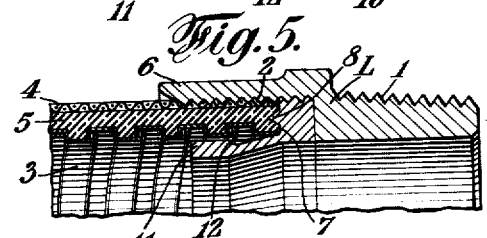
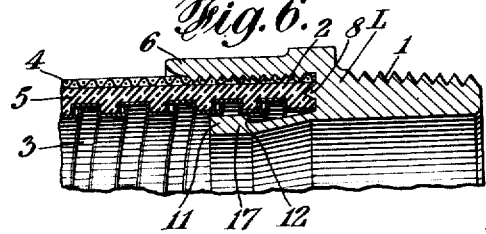
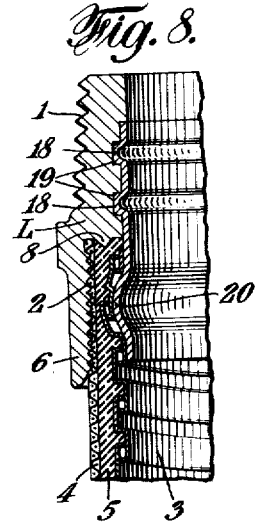
INVENTOR
Archibald L. Wallace.
BY L. Gissford Hardy
his ATTORNEY Patented June 20, 1933

1,915,041

UNITED STATES PATENT OFFICE

ARCHIBALD L. WALLACE, OF BROOKLYN, NEW YORK, ASSIGNOR TO METAL HOSE & TUBING CO., INC., OF BROOKLYN, NEW YORK, A CORPORATION OF NEW YORK

HOSE COUPLING

Application filed May 14, 1929. Serial No. 363,031.

This invention relates to a hose coupling. An object of the invention is to provide a coupling which is of small size and weight, for a given size of hose, and which may be easily and securely attached to the hose.

A further object is to provide a coupling adapted for use on so-called "gasoline hose", and which will effectively prevent the leakage of gasoline through the joint between the hose and the coupling.

A further object is to provide a coupling which will afford intimate electrical connection between the coupling and the metallic liner of the hose, such as is required to prevent static discharges within the hose.

A further and more detailed object is to provide a coupling including a main body portion within which the end of the hose is received, and to provide an expansible sleeve positioned interiorly of the body and hose adapted when expanded to squeeze and clamp the interposed portion of the hose between itself and the body.

A further detailed object is to provide a coupling adapted for connection with a hose having a metallic liner, a canvas cover, and a rubber filler, the coupling having a part to receive the hose and having means expansible against the metallic liner to expand said liner and thus squeeze portions of the rubber filler into tighter sealing engagement with the body.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a side elevational view of a hose coupling having a section of hose connected therewith, a portion of the view being shown in longitudinal section to disclose the expansible part of the coupling as it appears just prior to being expanded.

Fig. 2 is a similar view illustrating the condition of the hose after the expansible part of the coupling has been expanded.

Figs. 3, 4, 5, 6 and 7 are fragmentary detail views corresponding with the sectional portion of Fig. 1 but illustrating modified forms of the expansible portion of the coupling, and Fig. 8 is a view similar to Fig. 7 but illustrating the expansible portion of the coupling in said figure as it appears when fully expanded.

Referring to the drawing for describing in detail the structures shown therein, and considering first the structure shown in Figs. 1 and 2, the reference character L indicates the body of the coupling. This is in the form of a hollow tubular shell externally threaded at its forward end as at 1 and internally threaded at its rear end as at 2, the former being to provide attachment to any foreign object, and the latter being to provide threaded engagement with the exterior annular surface of the hose which is indicated generally by the reference character G.

Within the body is an expansible tubular member H.

While this coupling may be attached to hose of different types and constructions it is particularly effective when used in connection with hose having a flexible metallic liner as 3, a coarse canvas cover as 4, and a rubber filler 5, such hose being commonly used for carrying gasoline and other hydro-carbon liquid fuel, and being known as "gasoline hose."

The threads 2 of the coupling are provided within a seat formed by a rearwardly extending apron-like portion as 6 said seat being of just a proper diameter to snugly receive the hose so that the outer surface of the canvas 4 threads snugly along the threads 2 when the hose is being inserted into the seat. The engagement of the threads 2 with the relatively soft surface of the canvas is sufficiently tight so that inter-rotation as between the coupling and hose during assembly will cause the hose to move relatively into the coupling with sufficient force to bring the inner end surface of the hose into tight engagement against a rearwardly facing annular ledge or shoulder as 7 provided to receive it within the body L at the inner end of the threads 2 of the seat. The shoulder 7 is preferably provided with an annularly extending rearwardly facing V-shaped rib 8 so positioned that it will become forcefully embedded within the rubber filler of the hose when the hose is threaded home against the shoulder.

The expansible member H is formed separately from the body and is intended to be inserted into the body by being introduced through the forward end of the body. When inserted it extends substantially throughout the length of the coupling. It is normally tapered to reduced diameter toward its rear end. At its forward end it carries an outwardly projecting annular rib as 9 which engages within an annular seat 10 at the forward end of the body so that rearward movement is positively arrested. Its smaller or rear end, which stands within the apron 6, and hence opposed to that portion of the hose which is within the apron, is provided with an outwardly projecting annular enlargement as 11 in position to directly engage the inner surface of the liner 3 of the hose when the expansible member is expanded.

It is particularly noted that the forward edge as 12 of the enlargement 11 is spaced rearwardly of the shoulder 7.

With the expansible member H fully inserted as described, and as shown in Fig. 1, a suitable expanding tool, of any appropriate type, not illustrated, is introduced into said member and is operated to expand said member from the position Fig. 1 to the position illustrated in Fig. 2, it being of course understood that the member H is of suitable material, such as soft brass, to enable it to be thus expanded and to enable it to remain in its expanded position after withdrawal of the tool.

By inspection of Fig. 2 it will be seen that the expansion of the member H has caused the enlargement 11 to press against and expand the adjacent portion of the metallic liner 3 of the hose so that the intervening portion of the rubber filler 5 has become materially compressed, and so that the adjacent portion of the canvas cover 4, in engagement with the threads 2 of the apron, has been correspondingly forced into tighter and more secure engagement with said threads.

It is particularly noted that this compression of the rubber and canvas has naturally caused considerable portions thereof to be squeezed forwardly and forcefully crowded against the shoulder 7. The rubber has been condensed and crowded against and about the V-shaped rib 8.

An exceedingly tight joint between the hose and the coupling is thus provided which is readily capable of preventing leakage of gasoline or the like.

The connection is also of great mechanical strength due to the fact that with the member H expanded there is formed within the coupling an annular cavity or groove as 13 which is relatively larger than the passage leading to it between the apron and the portion 11 of the expansible member, and the hose has a hardened annular end bead or head filling said cavity and relatively larger than its portion within the passage. The relatively reduced or neck portion of the hose within the passage is also tightly gripped between the apron and the expansible member, and a portion of the metallic liner extends forwardly beyond the neck and constitutes a part of the bead or head of the hose within the enlarged cavity 13.

It will be understood of course that the apron 6 is of such proportions as to withstand, without distortion, all of the pressures referred to, and it may be mentioned here that experiments with this coupling and hose have demonstrated conclusively that the mechanical strength of connection between the coupling and the hose is so great that the body of the hose itself will invariably pull apart without in the least disturbing the connection when strain is applied.

In extreme instances the hose, if desired, may have its end portion dipped into liquid shellac or other suitable cementitious material just prior to insertion of the hose within the coupling. This material will seal any possible crevices and is particulary serviceable in guarding the rubber against attack from the gasoline.

In the modification Fig. 3 the structure is the same as above described except that the expansible member employed, and here designated by the reference character 14, is shorter than the expansible member shown in Figs. 1 and 2. It is of simple cylindrical, non-tapered, form, and its outstanding rib 15, corresponding with rib 9, is adapted to engage within a seat 16 of the body, corresponding with seat 10. The engagement of the rib within the seat in this case however is not effected until the expansible member is expanded. The operation of expanding said member for squeezing against the hose will at the same time move the rib into the seat so that final result is substantially the same as already set forth.

The modification Fig. 4 is the same in all respects as the structure Figs. 1 and 2 except that it suggests that the expansible member if desired be made shorter and be threaded into the body L, as indicated at 16.

The modification Fig. 5 suggests that if desired the expansible member may be formed to include the shoulder 7 and rib 8, also that it may in this event be threaded into the body of the coupling by means of the threads 2.

The modification Fig. 6 suggests that if desired the expansible portion, here designated by the reference character 17, may be formed as an integral part of the main body.

The modification Figs. 7 and 8 is similar to the arrangement shown in Fig. 3, except that in Figs. 7 and 8 the expansible member is normally of uniform thickness and is adapted itself to be not only expanded bodily but to be especially expanded in certain localities so as to provide one or more ribs as 18—18 to engage within grooves 19—19 of the body and a further rib 20 for pressing against the hose in the manner as described for the enlargement 11 of the previous figures.

In all cases the expansible member constitutes a metallic bridge between the metallic liner of the hose and the body of the coupling, in good electrical contact with both, so that a proper electrical conductor is provided throughout the hose and coupling to any tank or other object to which the forward end of the coupling may be connected. The probability of static discharge within the hose is overcome by this means.

Both the mechanical and electrical engagement between the metallic liner of the hose and the expansible member H is materially improved by reason of the inclined or spiralled relation of the ridges on the inner surface of the liner 3 with respect to the annular non-spiralled character of the enlargement or rib 11, or 20.

The method of assembling the hose and coupling Figs. 7 and 8, provides upon the sleeve a rib which was not there before. By the same act it forms in the metallic lining an annular groove which was not there before. And it provides these features in such a manner that the rib has a perfect fit within the groove and a highly efficient surface contact with the walls of the groove affording both an excellent contact between the liner and the sleeve, and at the same time it insures a good squeezing or crowding action of the rubber filler along the outer surface of the liner toward the shoulder at the inner end of the hose seat.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A hose coupling comprising a body having a seat therein adapted to receive the end portion of a piece of hose, said seat being threaded to engage the hose for moving the hose relatively into the seat by inter-rotation as between the body and the hose, said body having an annular shoulder therein constituting the inner end of said seat adapted to be engaged by the end surface of the hose to limit inward movement of the hose, said seat having an annular rib thereon to be engaged by the hose, the hose consisting of a metallic liner, a canvas cover, and a rubber filler, said rib being positioned to be engaged by the end edge of the rubber filler, and an expansible tubular member arranged within the body and secured thereto adapted when expanded to engage the inner surface of the metallic liner adjacent said shoulder for expanding said liner and thereby squeezing the rubber filler into more intimate engagement with said rib.

2. A hose coupling comprising a body having a seat therein adapted to receive the end portion of a piece of hose formed of compressible material and having an annular groove therein spaced from said seat, and a separately formed tubular member arranged within said body and adapted to extend into the hose, said hose being of compressible material, and said tubular member having two independently expansible portions one of said portions being expansible to form an annular rib projecting outwardly of said tubular member to engage within the groove of the body and the other of said portions being expansible to form a second annular rib projecting outwardly of said tubular member disposed for compressing the material of the hose to thereby clamp the hose between itself and the wall of the seat.

3. A hose coupling comprising a body having a seat therein adapted to receive the end portion of a piece of hose and having an annular groove therein spaced from said seat, the seat having a shoulder at its inner end to be engaged by the end surface of the hose, and a separately formed tubular member of expansible material arranged within the body extending into the hose, said hose being of compressible material and said tubular member being expanded to provide one annular rib thereon engaging within the groove of the body and a second annular rib thereon for engaging the hose at a point spaced from the shoulder to compress the material of the hose between the second rib and the annular wall of the seat at said point spaced from the shoulder for thereby providing a head-like bead upon the hose between the second rib and the shoulder.

4. In combination, a hose and a coupling therefor, the hose comprising a tubular member of flexible elastic rubber and having a tubular metallic liner therein formed with projections intimately engaged with the rubber so that the liner is immovable longitudinally of the rubber, the coupling comprising a body member having a seat therein to receive the end portion of the hose and having a shoulder at the inner end of said seat to limit movement of the hose into the seat, and said coupling including a separately formed tubular member of expansible material interiorly thereof having one part arranged interiorly of the metal hose liner having an annular rib thereon engaging said liner, said liner being expansible and being expanded by pressure from said rib to thereby form an annular groove interiorly of the liner into which the rib projects thus at once forcing the exterior surface of the hose radially outwardly against the annular wall of said seat and providing interlocking connection between the liner and said tubular member to hold said liner and tubular member against relative longitudinal movement, and said tubular member having another portion extending beyond the end of the hose and connected with the body so as to be held against movement through the body toward the hose.

5. In combination, a hose and a coupling therefor, the hose comprising a tubular member of flexible elastic rubber and having a tubular metallic liner therein formed with projections intimately engaged with the rubber so that the liner is immovable longitudinally of the rubber, the coupling comprising a body member having a seat therein to receive the end portion of the hose and having a shoulder at the inner end of said seat to limit movement of the hose into the seat, and said coupling including an interior tubular part connected at one end by the body so as to be immovable longitudinally of the body, said tubular part projecting interiorly of the metallic hose liner and having an annular rib thereon engaging said liner, said liner being expansible and being expanded by pressure from said rib to thereby form an annular groove interiorly of the liner into which the rib projects thus at once forcing the hose radially outwardly against the annular wall of said seat and providing an interlocking connection between the liner and the tubular member to hold said liner and tubular member against relative longitudinal movement.

6. A hose coupling comprising a body member having an annular seat formed therein adapted to receive an end portion of a piece of hose and being of relatively fixed diameter, and a separate cylindrical member fitted into the body having engagement therewith of a character to prevent movement of the member with respect to the body longitudinally in both directions, said cylindrical member having an expansible cylindrical portion extending away from its point of connection with the body and adapted to project into the hose within the seat, said cylindrical portion having an annular part of itself spaced away from the end of the hose expanded outwardly while standing in contact with the inner surface of the hose thereby forming an annular recess interiorly of the material of the hose and clamping the exterior surface of the hose against the wall of said seat, and said annular part of said cylindrical portion being of material expanded in the formation of said recess and thereby fitting intimately thereto.

7. In combination, a hose and a coupling therefor, the hose coupling comprising a body having a seat therein adapted to receive the end portion of a piece of hose extending thereinto, said body having an annular shoulder therein constituting the inner end of said seat adapted to be engaged by the end surface of the hose to limit inward movement of the hose, the hose having a metallic liner and a rubber cover, and an expansible tubular member having a portion arranged within the body secured thereto holding the tubular member against movement toward the hose, said tubular member having another portion projecting from the body into the end of the hose within the seat and being expanded to form a rib thereon engaging the inner surface of the metallic liner in spaced proximity to said shoulder thereby expanding the portion of the liner overlying said rib and squeezing the rubber filler into more intimate engagement with said shoulder.

8. In combination, a hose and a coupling therefor, the hose comprising a tubular member of flexible elastic material having a tubular metallic liner therein, the outer surface of the liner being formed with a spirally extending ridge engaged by the overlying portion of the hose effective to prevent longitudinal movement of the liner with respect to the remainder of the hose, the inner surface of the liner being also formed with a spirally extending ridge, the coupling comprising a body member having a seat therein to receive the end portion of the hose and having a shoulder at the inner end of the seat to limit movement of the hose into the seat, and said coupling including an interior tubular metallic part connected with the body at a point inwardly beyond the seat in a manner effective to prevent movement of the tubular part with respect to the body in a direction toward the hose, said tubular part projecting into the hose liner and having an annular non-spiral rib thereon engaging the liner, said liner, including the spiral ridges thereof, being expansible and being expanded by pressure from said rib to thereby form an annular non-spiral groove interiorly of the liner into which the rib projects thus at once forcing the hose radially outwardly against the annular wall of the seat and providing an interlocking connection and an electrically efficient metallic contact between the inner spiral ridge of the liner and the non-spiral rib of the tubular part effective to prevent longitudinal movement of the liner with respect to the tubular part in a direction outwardly away from the point of connection between the tubular part and the body.

In testimony whereof I affix my signature.

ARCHIBALD L. WALLACE.

DISCLAIMER 1,915,041.—*Archibald L. Wallace*, Brooklyn, N. Y. HOSE COUPLING. Patent dated June 20, 1933. Disclaimer filed March 30, 1939, by the assignee, *Metal Hose & Tubing Co. Inc.*

Hereby disclaims claims 2, 3, and 6 of the aforesaid Letters Patent.
[*Official Gazette April 25, 1939.*]

thereby form an annular non-spiral groove interiorly of the liner into which the rib projects thus at once forcing the hose radially outwardly against the annular wall of the seat and providing an interlocking connection and an electrically efficient metallic contact between the inner spiral ridge of the liner and the non-spiral rib of the tubular part effective to prevent longitudinal movement of the liner with respect to the tubular part in a direction outwardly away from the point of connection between the tubular part and the body.

In testimony whereof I affix my signature.

ARCHIBALD L. WALLACE.

DISCLAIMER 1,915,041.—*Archibald L. Wallace*, Brooklyn, N. Y. HOSE COUPLING. Patent dated June 20, 1933. Disclaimer filed March 30, 1939, by the assignee, *Metal Hose & Tubing Co. Inc.*

Hereby disclaims claims 2, 3, and 6 of the aforesaid Letters Patent.

[*Official Gazette April 25, 1939.*]

DISCLAIMER 1,915,041.—*Archibald L. Wallace*, Brooklyn, N. Y. HOSE COUPLING. Patent dated June 20, 1933. Disclaimer filed March 30, 1939, by the assignee, *Metal Hose & Tubing Co. Inc.*

Hereby disclaims claims 2, 3, and 6 of the aforesaid Letters Patent.

[*Official Gazette April 25, 1939.*]